United States Patent

Leonard

[15] 3,692,952

[45] Sept. 19, 1972

[54] APPARATUS FOR ESTABLISHING A TELEPHONE TO RADIO-TELEPHONE COMMUNICATION

[72] Inventor: Didier Leonard, Boulogne, France

[73] Assignee: C.I.T. - Compagnie Industrielle des Telecommunications, Paris, France

[22] Filed: Feb. 19, 1970

[21] Appl. No.: 12,576

[30] Foreign Application Priority Data

Feb. 19, 1969 France ................6904070

[52] U.S. Cl. ................................................179/41 A

[51] Int. Cl. ................................................H04q 7/04

[58] Field of Search..................179/41 A; 325/53, 64

[56] References Cited

UNITED STATES PATENTS

| | | | |
|---|---|---|---|
| 3,118,018 | 1/1964 | Cornell et al. | 179/15 |
| 3,428,899 | 2/1969 | Sekimoto | 325/55 |
| 3,513,264 | 5/1970 | Baer | 179/41 A |
| 3,535,689 | 10/1970 | Oden | 325/15 |
| 3,351,714 | 11/1967 | Kunzelman et al. | 179/41 A |

*Primary Examiner*—Kathleen H. Claffy
*Assistant Examiner*—Thomas L. Kundert
*Attorney*—Craig, Antonelli and Hill

[57] ABSTRACT

The invention concerns duplex radiocommunications at variably-selected carrier frequencies.

It describes a concentrator ensuring the duplex connection at variably-selected carrier frequencies between a system of mobile transmitters and a telephone exchange comprising several unattended transmitter-receiver sets, in which the transmitter contains an individual call coder and a general call coder, the latter being used to establish the connection with a mobile set wanting to call up a telephone set.

The invention is applied to connecting an ordinary telephone system and a group of mobile radio electric transmitter receivers.

20 Claims, 6 Drawing Figures

APPARATUS FOR ESTABLISHING A TELEPHONE TO RADIO-TELEPHONE COMMUNICATION

The invention relates to radio-electric tele-communications, and more particularly to apparatus for establishing communications between a telephone network and a group of radio-telephones. Such apparatus provides connections between the transmitter-receivers of the radio-telephone network, and the subscribers of an ordinary telephone network served by a fixed exchange. The radio-telephone network operates in duplex connection, and is distinguished in that the transmitter of a subscriber calling another subscriber adopts a pair of frequencies which are free at the moment of the call. The frequencies are taken from a frequency spectrum allotted to the radio-telephone network. The pair of transmission and reception frequencies is independent of the subscriber making the call, and of the called subscriber, being chosen at random among the frequencies of the spectrum which are free at the time of the call. Thus the carrier-frequencies available are common to all stations participating in the network.

Duplex radio communication equipment, using common frequencies chosen at random, has been proposed in the Applicants' copending application Ser. No. 750,986, and now U.S. Pat. No. 3,631,497. In this apparatus, a particular and even number of frequencies, 100 for example, form the spectrum allotted to the radio-telephone network. A transmitter-receiver is provided for each subscriber, and includes a device for searching out a free channel which, at the time of a cell, adopts the first free channel encountered during a frequency exploration as its reception channel, using a carrier-frequency $f_1$. The channel is only adopted if, after checking, a corresponding channel separated from the first by 50 steps is also free, when this further channel is taken as the transmission channel using a carrier-frequency $f_2$. The search device is stopped when the two channels having carrier-frequencies $f_1$, $f_2$ are both free.

For the called subscriber, it is understood that the allocation of frequencies is inverted; $f_1$ is taken as the carrier-frequency of the transmission channel, and $f_2$ as that of the reception channel. In the equipment of the called subscriber, the search device stops on a channel on which is received a coded modulation indicative of the called subscriber, broadcast by the caller on the carrier-frequency $f_2$.

The allocation of the first free frequency encountered for reception by the caller, to the exclusion of the other frequency of the same pair, and the opposite allocation for the called subscriber, are made possible by the fact that the caller initiates a call by picking up his hand-set to call his correspondent on the frequency $f_2$, while the called subscriber not yet having picked up his hand-set, selects as reception channel that on which his code is received.

When the communications between radio-telephones are complemented by communication between the radio-telephones and an ordinary telephone network, certain special precautions must be taken. In the present case, the interface between the radio and wired networks is constituted by an apparatus referred to hereafter as a concentrator. This contains several transmitter-receiver arrangements, connected to the telephone lines of the fixed network serving a telephone exchange, and to one or several aerials. As such a concentrator is intended to function automatically, there is no operator available when, a subscriber on the fixed network wishing to call a subscriber on the radio-telephone network, a transmitter-receiver arrangement of the concentrator must be placed in a caller condition. The physical condition of the transmitter-receiver arrangements equipping the concentrator remains the same whatever the function to be filled. In their Application Ser. No. 887,232 and their Application Ser. No. 771,008, now U.S. Pat. No. 3,537,026, the Applicants describe an arrangement in which the frequency spectrum is divided into two halves, that for a caller containing frequencies destined for reception, and the other containing frequencies for transmission. The opposite is true for a called subscriber, thanks to a logical condition defined by the position of his hand-set. From the entire spectrum, containing 100 frequencies for example, groupable in pairs with random allocations between reception and transmission, 50 re-constituted frequency pairs are deduced, having a pre-determined allocation of reception and transmission frequencies for a caller. The frequency search thus involves 50 steps corresponding to the 50 frequency pairs, instead of 100 steps corresponding to the 100 frequencies.

The present invention concerns apparatus including a synthesizer as described above and more fully disclosed in the above-mentioned Patent Applications.

In accordance with the invention, there is provided apparatus for establishing communication between a telephone network having an exchange connected to the apparatus by ingoing and outgoing telephone lines, and a group of radio-telephones each having its own individual call-code and operating in duplex connection with common carrier-frequencies, the apparatus including: at least two fixed transmitters each having a first, variable coder which is set to a selected individual call-code to call the corresponding radio-telephone, and a second, fixed coder for transmitting a general call-code available to any radio-telephone wishing to establish communication with the telephone network; circuitry connected to the fixed transmitters to ensure that not more than one of them is transmitting the general call-code at any one time; circuitry connected to the fixed transmitters to cut-off transmission of the general call-code when the transmitter transmitting it enters into a communication: and to transfer general call-code to the other or another fixed transmitter.

The basic principle of operation is the following:

If a radio-telephone subscriber wishes to call another radio-telephone, the method of establishing communication is as described in the above-mentioned Patent Applications.

When a telephone subscriber wishes to call a radio-telephone, one of the transmitter-receiver arrangements of the concentrator, operating as "caller", broadcasts the code of the radio-telephone. This is picked up by the receiver of the radio-telephone with its individual decoder, and initiates the process for establishing the connection.

When a radio-telephone subscriber wishes to call a normal telephone, he switches his receiver to a general call-code decoder incorporated in the receiver, and which decodes the general call-code broadcast by one of the concentrator arrangements operating as "caller". The concentrator arrangements, whether broadcasting an individual code or the general call-code, always operates as caller, and thus does not change configuration whatever its function. It is this factor which compensates for the absence of an operator switching from a mobile-to-fixed call condition to a fixed-to-mobile one.

The concentrator will always include more than one transmitter-receiver arrangement. In fact, a rational installation must permit the establishment of a second communication during the operation of the first.

In this case, if there are at least two arrangements in the concentrator (and there will in general be rather more) it is indispensable that they transmit in a common first frequency band, and receive in a common second frequency band. If not, very difficult filtering problems will be encountered. Such an arrangement involves two conditions:

Each transmitter-receiver arrangement of the concentrator must be always in the same configuration, acting as "caller" for example. Also, the frequencies carrying the call modulation must all lie in the same half of the frequency spectrum.

The concentrator always operates as "caller", and so has all its transmission frequencies and all its reception frequencies divided into two groups sufficiently separated to provide efficient protection against interference between a transmission and a reception in duplex communication. Because of this, several conversations can take place on different channels, which would not be possible if the transmitter-receiver arrangements of the concentrator operated as "caller" for establishing a connection between a telephone and a radio-telephone, and as "callee" for establishing a communication in the opposite direction.

In the group of available channels, one half is used for transmission by a caller, the other half being used for transmission by a called subscriber. The selection depends on whether the hand-set is raised or set down, or alternatively on an equivalent logical instruction.

The invention will now be described in more detail, by way of example only, with reference to the accompanying diagrammatic drawings, in which.

Figure 1:
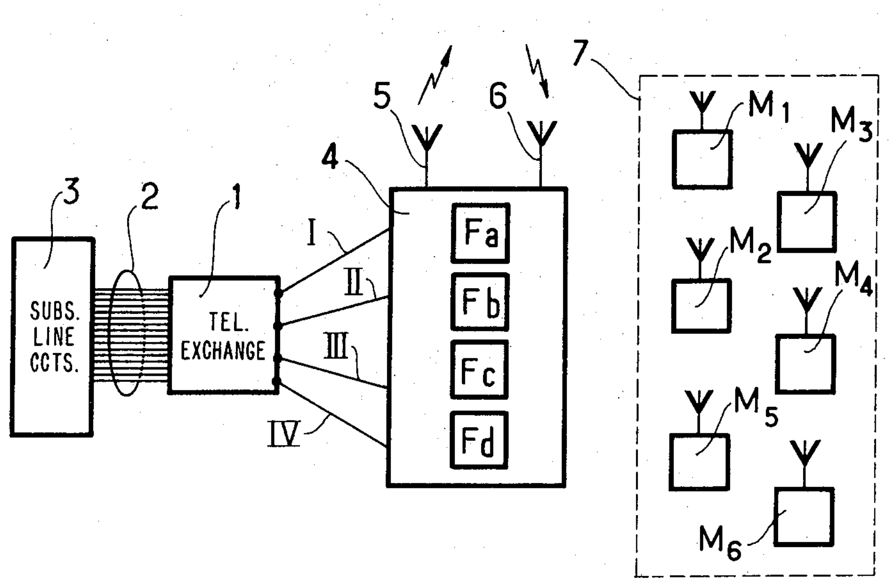
FIG. 1 is a block diagram showing the relationship between a telephone exchange, a concentrator, and a radio-telephone network.

Referring to FIG. 1, a telephone exchange 1 is linked by a system of telephone lines 2 to a network of subscribers 3. The exchange is also connected to a concentrator 4 by lines I, II, III, and IV. Each of the lines comprises four wires. The concentrator 4 enables a communication to be set up between network of telephone subscribers 3 and a network of radio-telephones 7. The radio-telephones of network 7 will usually be mobile stations, for example shipboard radio-telephones.

The concentrator 4 includes four fixed transmitter-receiver arrangements, F*a*, F*b*, F*c*, and F*d*. It has a transmission aerial 5, and a reception aerial 6.

Six of the radio-telephones of network 7 are shown as $M_1$ to $M_6$. Evidently, the number of radio-telephones is not limited to six, and is generally much greater. One current practice in telephony systems is to have a ratio of 10 between the number of subscribers and the number of available communication channels.

Figure 2:
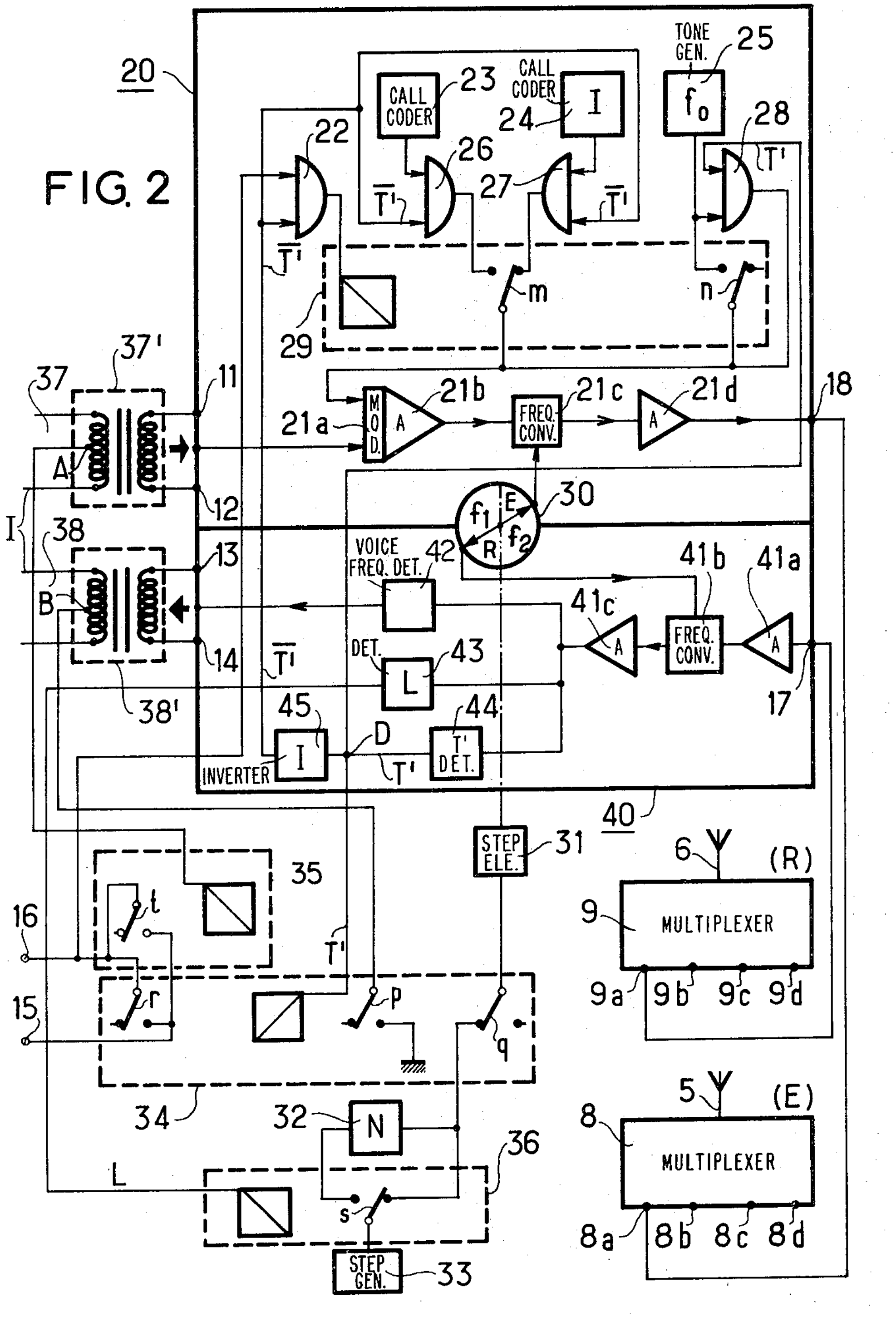
FIG. 2 is a simplified block diagram of a transmitter-receiver arrangement of the concentrator.

One of the transmitter-receiver arrangements of the concentrator 4 is shown in FIG. 2.

This arrangement is generally similar to the transmitter-receiver provided for radio-telephone communications with shared frequencies, described in the above-mentioned U.S. Application Ser. No. 750,986 now U.S. Pat. No. 3,631,497. These common points will not be described in detail, but those relating specifically to the present invention will of course be fully described.

Certain logical signals will now be defined, these being signals defined in the Patent Application mentioned in the previous paragraph.

L represents an available frequency signal: L = 1 signifies that both frequencies, $f_1$ and $f_2$, of a frequency pair are available, that is are not providing any modulation at a pre-determined frequency $f_o$. This frequency is 3,400 Hertz, while the vocal frequency spectrum transmitted covers a band of 300 to 3,000 Hertz.

A represents a recorded call signal: A = 1 signifies that an installation being called has picked up a code and identified it as its individual call-code. This identification is carried out in a decoder, and in response to the detection of the code, an engaged tone is broadcast by the called installation.

C is a signal indicating the condition of an installation. In the general case where the installation includes a hand-set, C = 1 signifies that the hand-set has been lifted, while C = 0 signifies that the hand-set is still in place on the instrument.

T' represents a signal given in response to the engaged tone at a frequency $f_o$. T' = 1 signifies that the installation making a call is broadcasting the engaged tone, either after having found a free channel in the case of a general call, or after having received a frequency $f_o$ from the installation it is calling in the case of an individual call.

T is a traffic signal: T = 1 signifies broadcasting of the engaged tone by the installation making a call or the called installation. The logical relation T = A + T' is obtained.

These various logical signals will be used in describing the circuitry of FIG. 2.

Each transmitter-receiver installation of the concentrator includes a transmitter 20, a receiver 40, a generator of pairs of carrier-frequencies with a frequency search element 30, common to the transmitter and receiver. The transmitter is coupled to a transmission aerial 5, via an input 8*a* of a multiplexer 8. The multiplexer 8 has three other inputs 8*b*, 8*c* and 8*d*. A receiving aerial 6 is connected to the receiver via an input 9*a* of a multiplexer 9, also having three other inputs, 9*b*, 9*c*, and 9*d*.

The transmitter 20 includes a low-level amplifier 21*b*, associated with a modulator 21*a*. The output of the amplifier 21*b* is connected via a frequency-changer 21*c* incorporating appropriate filters, to a power-amplifier 21*d*. The frequency changer 21*c* also receives one of the pair of frequencies provided by element 30. The transmitter also includes a general call coder 23, an individual call coder 24, and an engaged tone generator 25. The engaged tone is provided by a signal at frequency $f_0$. A relay 29 has a set of change-over contacts indicated at *m*, and a further set of contacts *n* connected as an on-off switch. The moving contacts of the sets of contacts *m* and *n* are connected together to one input of modulator 21*a*. The normally open contacts of set *m* connect the output of an AND-gate 26 to this first input of the modulator 21*a*. The AND-gate 26 has two inputs, a first connected to receive the output of the general call coder 23, and the second connected to receive the logical signal $\overline{T'}$. The normally-closed contacts of set *m* connect the output of an AND-gate 27 to this first input of modulator 21*a*. The AND-gate 27 also has two inputs, one receiving the output of the individual call-coder 24, and the other receiving the signal $\overline{T'}$. Thus, when $\overline{T'} = 1$, either the general call-code or the individual call-code can pass to the modulator 21*a* via the respective AND-gate 26 or 27, depending on the position of the moving contact of set *m*.

The output of the generator 25 is connected to the first input of the modulator 21*a* via the on-off switch formed by the set of contacts *n*. The contacts *n* are so arranged that the switch is on when the relay 29 is energized. The output of the generator 25 is also applied to one input of an AND-gate 28 which receives on a second input the signal T'. The output of this AND-gate 28 is also connected to the first input of the modulator 21*a*.

The concentrator is connected to the telephone exchange by the four-wire line I. This line comprises two pairs of wires, an incoming pair 37 being connected to a center-tapped primary winding of a transformer 37'. The secondary winding of transformer 37' is connected to terminals 11 and 12 and thence to a second input of the modulator 21*a*. An outgoing pair of wires 38 is connected to a center-tapped secondary winding of a transformer 38'. The primary winding of transformer 38' is connected to terminals 13 and 14, and thence to the output of the voice frequency detector 42.

The center-tap B of transformer 38' can be grounded via the normally open contacts of a set of contacts *p* of relay 34. The normally closed contacts of a set of contacts *q* of the same relay provide part of the connection between the stepping generator 33 and the stepping element 31, as described above. A normally open contact of a set of contacts *r* of the relay 34 connects the terminal 16 to a terminal 15 when the relay 34 is energized.

A further relay 35 is energized by a voltage appearing at the center-tap A of the transformer 37'. This voltage appears when the concentrator is called by the telephone exchange. A normally open contact of a set of contacts *t*, connects together the terminals 15 and 16 when the relay 35 is energized.

The relay 36, energized by the signal L, connects the stepping generator 33 to the set of contacts *q* of relay 34, either directly via a normally closed contact, or via the divider 32 via a normally-open contact. The division factor N of divider 32, for a system employing 50 pairs of frequencies is preferably between 150 and 200.

The general call code is transmitted on a free channel for a pre-selected period only. At the end of this period the element 30 searches for another free channel and the general call code is then transmitted on that channel for the same period. It is thus possible to avoid jamming, whether deliberate or accidental, on the previous channel.

The relay 29 is energized by the output of an AND-gate 22 having a first input connected to receive the signal $\overline{T'}$ and a second input connected to a terminal 16. Terminal 16 can be connected to a power supply, in a way which will be explained below. Relay 29 is energized when a power supply is available at terminal 16 and when $\overline{T'} = 1$. The output of the transmitter 20, taken from the power amplifier 21*d*, is applied to an output terminal 18 connected to the transmission aerial 5 via the multiplexer 8.

The receiver includes a low-level amplifier 41*a*, a frequency changer 41*b* including the appropriate filters, and an intermediate-frequency amplifier 41*c*. The frequency changer 41*b* is connected to the element 30 to receive the other frequency of the pair which first frequency is applied to the frequency changer 21*c* of the transmitter 20. The output of the intermediate-frequency amplifier 41*c* is applied to a voice frequency detector 42, a circuit 43 for detecting the logical signal L, and a circuit 44 for detecting the logical signal T'. The detector 44 has an output terminal D connected to the input of an inverter 45 providing at its output the signal $\overline{T'}$. The logical signal L from detector 43 is used to energize the coil of a relay 36. This relay has a set of change-over contacts *s*, arranged to connect a step generator 33 to a stepping element 31 either directly through a set of contacts *q* of a relay 34, or through the contacts *q* and a circuit 32 arranged to divide the output of generator 33 by N. The relay 34 is energized by the signal T'.

The input of the amplifier 41*a* is connected to an input terminal 17 of the receiver, which is connected to the receiving aerial 6 via the multiplexer 9.

The frequency-pair generator provides a pair of frequencies $f_1$ for reception and $f_2$ for transmission, to the element 30 which is a rotary switch driven by the stepping unit 31.

Figure 3:
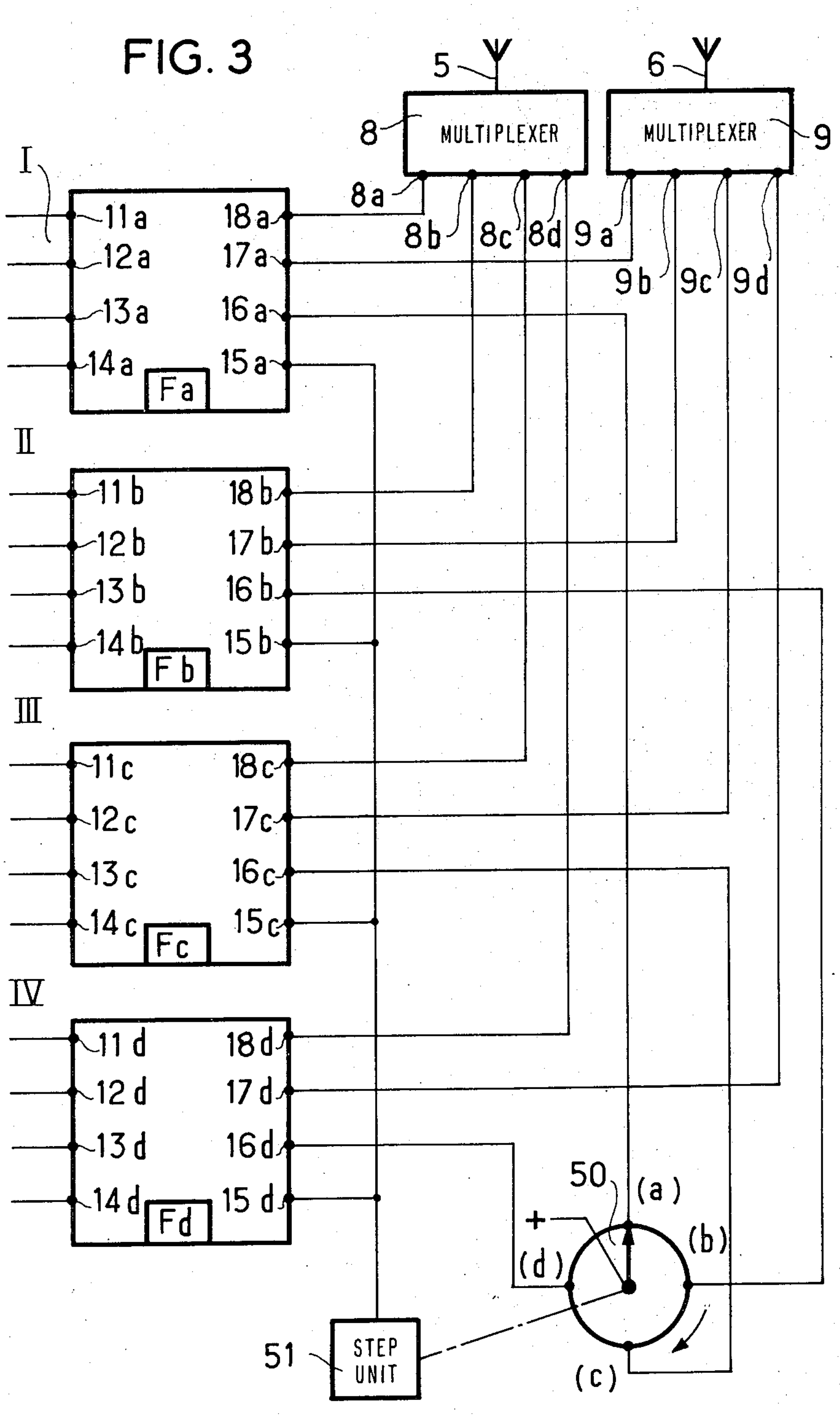
FIG. 3 is a block diagram of a concentrator having four transmitter-receiver arrangements.

The operation of the assembly shown in FIG. 2 will be described with reference to FIG. 3. FIG. 3 is a simplified block diagram of a concentrator, showing four transmitter-receiver arrangements F*a*, F*b*, F*c*, Fd each being identical to that shown in FIG. 2. In each transmitter-receiver arrangement, the terminals 11 to 18 are shown with the addition of a letter indicating the arrangement in question. Thus the arrangement F*a* has terminals 11*a* to 18*a*. The indexing of the input terminals of multiplexers 8 and 9 corresponds to that of the transmitter-receiver arrangements, and thus the arrangement F*a* has its terminals 18*a* and 17*a* respectively connected to terminals 8*a* and 9*a*.

A rotary four-terminal switch 50 is driven by a stepping unit 51. The moving contact connects a source of supply, indicated symbolically by the plus sign (+), to any one of the four terminals *a* to *b* of the switch 50. These terminals are connected to the respective terminals 16 of the transmitter-receiver arrangements F*a* to F*b*.

Turning back to FIG. 2, it is seen that a direct connection between the terminals 15 and 16 may be obtained by energizing either relay 34 or relay 35. With such a direct connection, the power supply + is connected to the stepping unit 51, which drives the moving contact of switch 50 clockwise in the diagram, until it arrives at one of the terminals *a* to *d* where there is no such direct contact between the corresponding terminals 15 and 16. The number of arrangements F is chosen in accordance with statistical considerations so that, given the parameters of the radio-telephone network 7 and that of the telephone network 3, there is always at least one arrangement wherein the terminals 15 and 16 are not directly linked.

The operation of the concentrator will now be described, with reference to both FIGS. 2 and 3.

When the AND-gate 22 receives a signal $\overline{T'} = 1$, (no engaged tone at frequency $f_o$ received), if the switch 50 is at position *a* and the relays 34 and 35 are de-energized, the relay 29 is energized by the power supply + being connected to the terminal 16*a*. The normally-open contacts of the set *m* thus connect the general call coder 23 to the first input of the modulator 21*a*. The arrangement F*a* thus transmits the general call code.

This code is to be picked up by a radio-telephone subscriber wishing to call a subscriber on the telephone network. In these conditions, each free transmission general of the 50 provisionally taken by the arrangement Fa must be held for a sufficiently long time, in the exploration of the frequency spectrum for the radio-telephone subscriber who wishes to make a call to detect the general call code. The stepping unit 31 of the arrangement F*a* must thus turn N times less quickly than the stepping unit employed in the radio-telephone installation. The signal L = 1 (free channel) energizes the relay 36, and interposes, by means of the normally open contacts, the divider 32 between the stepping generator 33 and the stepping unit 31. The optimal value for the division factor N of divider 32 is between 150 and 200 for a 50 frequency-pair system, the value derived from a detailed study of the different possible arrangements.

If a signal $\overline{T} = 1$ appears at the output of the detector 44, that is in the case of a response by a radio-telephone subscriber to the general call code, the relay 34 is energized. The normally open contacts *p* close, and the center-tap B of transformer 38′ is connected to ground. Notification of the call is thus transmitted to the telephone exchange over the pair of wires 38. The normally closed contacts *q* of relay 34 open, and the stepping unit 31 is stopped. The normally-open contacts *r* close to energize the stepping unit 51 and move on the moving contact of the switch 50 by at least one step. The arrangement F*a* is no longer affected by the general call code, which is transferred to another arrangement, being the first encountered during operation of the switch 50 in which the relay 34 is deenergized. The arrangement F*a* is now devoted to a communication between the telephone network and the radio-telephone network.

If the concentrator receives a call from the telephone exchange for a radio-telephone subscriber, a unidirectional voltage appears at the center-tap A of the transformer 37′, via the incoming pair of wires 37. The relay 35 is energized, the normally-open contacts *t* close, and the stepping unit 51 begins to search for a transmitter-receiver arrangement which is available for the communication, having its relays 34 and 35 de-energized.

It is seen that a call originating in the telephone network has priority. It has the effect, by closing the normally-open contacts *t*, advancing the stepping unit 51 and cutting off the supply of the relay 29.

The engaged tone at frequency $f_o$ is transmitted during a conversation. Thus T′ = 1 and $\overline{T'} = 0$. The AND-gates 26 and 27 cut off both the general call code and the individual call code during the conversation. The frequency $f_o$ is also transmitted during broadcasting of the general call code, passing through the contacts *n* of the relay 29. It is not transmitted, however, during broadcasting of an individual call code; the contacts *n* are open, and T′ = 0, blocking the AND-gate 28.

Figure 4:
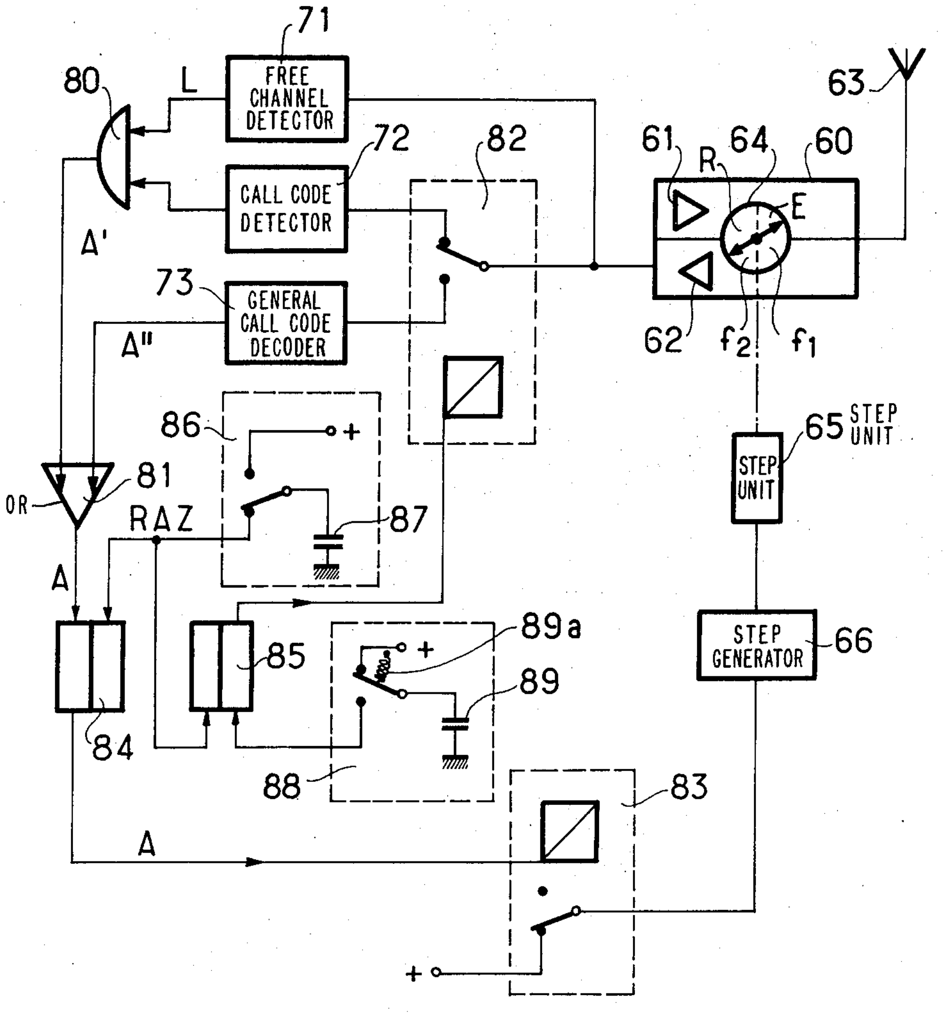
FIG. 4 is a simplified block diagram of the transmitter-receiver of a radio-telephone.

Turning now to FIG. 4, showing a radio-telephone installation in block diagram form, the block 60 represents a transmitter-receiver set virtually identical to the apparatus described in the above mentioned Patents and permitting communication with another station in the radio-telephone network. To simplify the figure, and to better define the scope of the present invention, only the parts which are not described in the above-mentioned Patents will be described in detail.

The transmitter and receiver of the station 60 are shown at 61 and 62 respectively, together with an aerial 63 and a rotary switch 64 providing pairs of frequencies $f_1$ and $f_2$ for transmission and reception respectively. The rotary switch switch 64 retains each frequency path for a sufficiently long period for a call code to be decoded.

The output of the receiver 62 is connected to a free channel detector 71, and to an element 72 for decoding the individual call code of the radio-telephone in question. Both the detectors 71 and 72 are already provided in the apparatus described in the above-mentioned Patent. The connection of the receiver 62 to decoder 72 is provided via a set of change-over contacts of a relay 82, operation of these contacts connecting the output of the receiver 62 to a general call code decoder 73 instead of to the decoder 72.

The decoder 72 is used to establish a communication when the radio-telephone is called, and the decoder 73 is used when the radio-telephone is making a call to a subscriber on the telephone network. When the radio-telephone is used to call another radio-telephone, an individual call coder (not shown) is used. An AND-gate 80 has one input connected to the output of detector 71, and another input connected to the output of detector 72. The output of AND-gate 80 is connected to one input of an OR-gate 81. A second input of the OR-gate 81 is connected to the output of the decoder 73.

The output of the OR-gate 81 is connected to one input of a bistable flip-flop 84. An output of the flip-flop 84 provides energization of a relay 83 having a normally closed contact arranged to energize a stepping generator 66 driving a stepping unit 65 for the rotary switch 64.

A condenser 89 is charged from a power supply through a normally-closed contact of a change-over switch 88. The moving contact of the switch 88 is spring-loaded with a spring 89a, and can be momentarily operated to discharge the condenser 89 into one input of a bistable flip-flop 85. The condenser 89 is immediately re-charged by the return of the moving contact to its normally closed position. The discharge of the condenser 89 switches the flip-flop 85 to its on position, and its output then energizes the relay 82.

A change-over switch 86 is operated by the hand set of the radio-telephone. When the hand-set is raised, a condenser 87 is charged from a power supply via the switch 86. When the hand-set is replaced, the condenser 87 is discharged into the reset inputs of the flip-flops 84 and 85, which return to their off positions.

The operation of the radio-telephone apparatus when receiving a call, whether from another radio-telephone or from the telephone network, is identical to that described in the above-mentioned Patents. A first stage is the stopping of the stepping unit 65 on a particular frequency path $f_1, f_2$ as the hand-set has not been lifted, the condenser 87 is discharged, flip-flop 85 is off, and the relay 82 is not energized. The decoders 71 and 72 are thus connected to the output of receiver 62. After the transmission of the signal L, indicating that the channel is free, the individual call code is decoded by the element 72 during the period separating two stepping signals provided by the generator 66. This decoding results in the application of a signal A′ through the OR-gate 81 to the flip-flop 84 to switch the latter on. The relay 83 is thus energized to interrupt the supply of generator 66. The stepping unit 65 is thus stopped on the required channel.

Now that the communication is engaged, the called subscriber picks up his hand-set and the capacitor 87 is charged via the switch 86. When the hand-set is hung up, the capacitor is discharged to return the flip-flop 84 to zero. The relay 83 is de-energized, and the step-by-step frequency exploration recommences with re-energization of the generator 66.

To call a telephone subscriber, the radio-telephone subscriber momentarily operates the switch 88. The flip-flop 85, triggered by the discharge of condenser 89, switches to its on position, so energizing the relay 82. The change-over contacts of relay 82 operate to connect the output of the receiver 62 to the general call decoder 73. This decodes the general call code to produce a signal A″, indicating that the general call code has been received, which passes through the OR-gate 81 to the input of flip-flop 84, as does the signal A′ from the AND-gate 80. The output of the OR-gate 81 is the logical signal A, and the logical relation A = A′ + A″ is obtained.

For the sake of convenience, the apparatus has been described with reference to electro-mechanical units, but it should be realized that generally the apparatus will be completely electronic.

FIGS. *5a*, *5b*, and *5c* show three different types of communication which can be set up with the apparatus just described.

M represents a radio-telephone subscriber, generally a mobile station. F represents the concentrator and S the telephone exchange. The individual call coder and general call coder are represented by CI and CG respectively, and the individual call code decoder and general call code decoder by DL and DG respectively.

A radio-telephone installation is represented by a rectangle divided into four squares, one labeled M, and the others showing that such an installation includes an individual call coder, an individual call decoder, and a general call decoder.

The concentrator is represented by a rectangle divided into three squares, one labeled F, and the other two showing that the concentrator includes an individual call coder and a general call coder.

The telephone exchange is represented by a single square labeled S.

FIG. *5a* shows a communication between two radio-telephones. The caller sends an individual call-code from its individual coder CI. This code is picked up by the corresponding decoder DL of the called subscriber.

FIG. *5b* shows a communication in which a telephone subscriber calls a radio-telephone subscriber. An individual call code is transmitted to the concentrator by the telephone exchange, is passed on by the coder CI of the concentrator, and picked up by the corresponding decoder DL of the called radio-telephone subscriber.

In FIG. *5c*, a radio-telephone calls a telephone subscriber by picking up on his general call decoder DG the general call code transmitted by the concentrators general call coder CG. Then the individual call coder CI of the radio-telephone sends an individual call-code to the concentrator F, which transmits the code to the telephone exchange S, whence it is directed to the called telephone subscriber.

Figure 5:
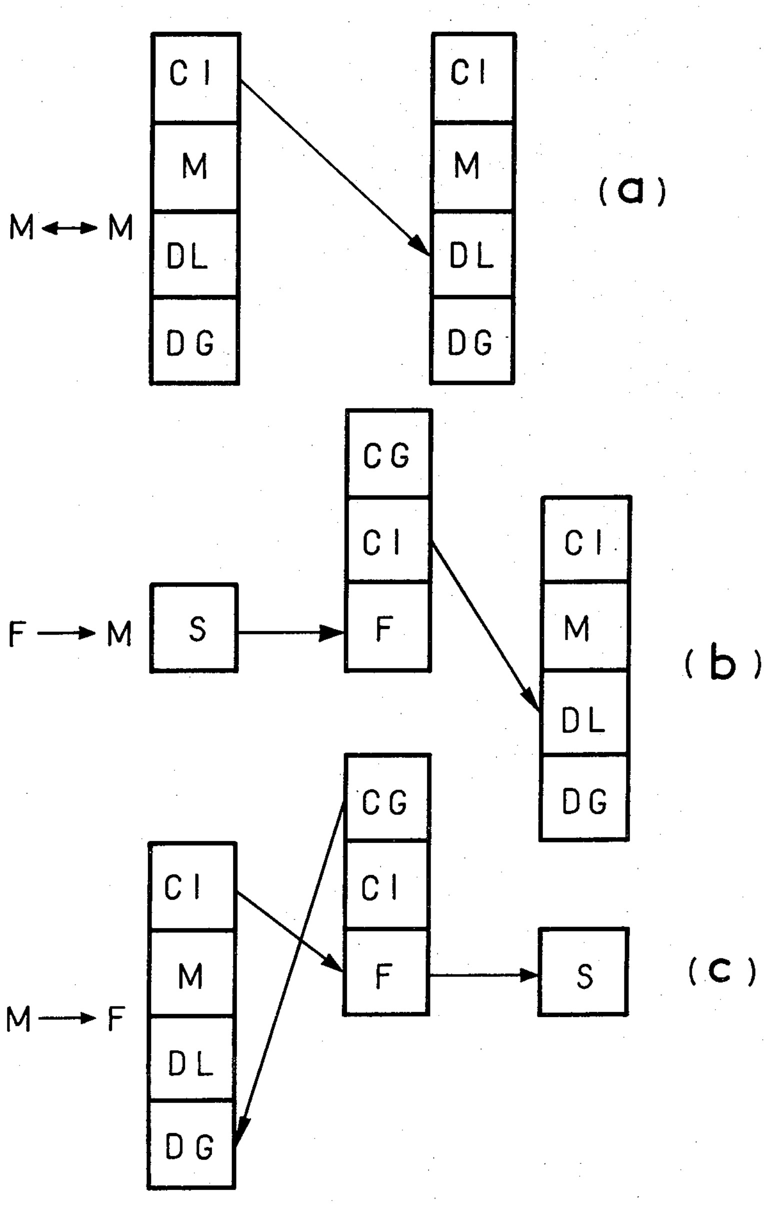
FIG. 5 shows symbolically three possible ways of establishing a communication two being via the concentrator.
Figure 6:
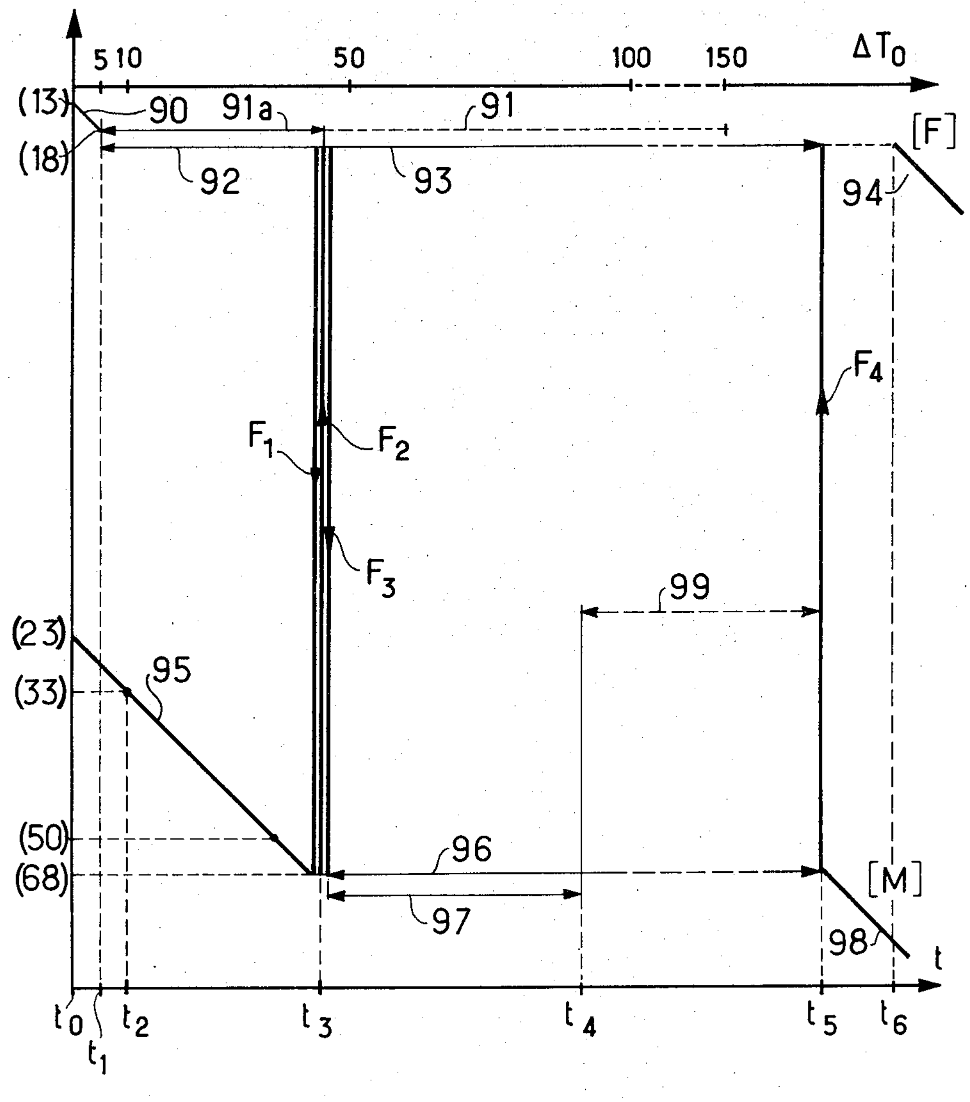
FIG. 6 is intended to show the development with time of the establishment of a communication in the case of a telephone subscriber called by a radio-telephone.

Of the three types of communication represented in FIG. 5, those of FIGS. *5a* and *5b* can be achieved without using the invention, and by using the apparatus disclosed in the above-mentioned Patents. The third type of communication, that shown in FIG. *5c* cannot be established without using the invention. The setting-up of this type of communication will now be considered in more detail, with reference to FIG. 6. In the figure, horizontal lines represent operations at fixed frequency, vertical lines the interreactions between the caller and the called subscriber, and the lines inclined at 45 degrees represent frequency variations, that is the step-by-step frequency search in the channel in operation.

The unit of time is $\Delta T_o$, the time for which any particular channel is retained by the radio-telephone for decoding a call code. $\Delta T_o$ is of the order of 100 milliseconds. In the diagram, the numbers in parenthesis are those of the channels, arbitrarily chosen and by way of example.

At the time origin of the diagram, $t_o$, one of the transmitter-receivers F of the concentrator has received an order to transmit the general call code AG. Supposing that at time $t_o$ the transmitter-receiver in question is locked on channel 13. The frequency search is started, in order to find a free channel, and progresses along the inclined line 90. The first free channel, channel 18 for example, is located at time $t_1$, which will be taken as equal to $5\Delta T_o$. At time $t_1$ the transmitter-receiver begins to transmit the general call code AG on channel 18, represented by the portion 91*a* of the horizontal line 91. At the same time the engaged tone at frequency $f_o$ is transmitted on the same channel (horizontal to line 92) the general call code is transmitted for a maximum of 150 $\Delta T_o$, the length of line 91.

At time $T_0$, the radio-telephone is set on channel 23. At time $t_2$, arbitrarily taken as equal to $10\Delta T_1$, the radio-telephone switches his receiver to pick up the general call code. At this time, the frequency scanning the the radio-telephone has reached channel 33, along the inclined line 95. The scan continues along line 95 until it reaches channel 68 at time $t_3$. At this time the general call code AG is picked up by the radio-telephone on channel 18. This connection is symbolized by the arrow F1.

At the same time the radio-telephone begins to transmit the engaged tone at frequency $F_o$ on channel 68, represented by the horizontal line 96. Also, the engaged tone is received by the transmitter-receiver of the concentrator on channel 68, this connection being symbolized by the arrow F2. The reception of the engaged tone from the radio-telephone cuts off transmission of the general call code but maintains transmission of the engaged tone on channel 18, as shown by the horizontal line 93. Relay 29 is de-energized but the transmission of the engaged tone is maintained by the gate 28. Transmission of the frequency $f_o$ is now maintained in a "closed-loop", transmission from one party maintaining that of the other.

Also at time $t_3$, the dialing tone (approximately 1,000 Hertz) is provided by the telephone exchange, as represented by the arrow $F_3$. This is immediately followed by the radio-telephone sending the code of the called telephone subscriber, represented by the line 97.

At the end of the transmission by the radio-telephone along line 97 is terminated, at time $t_4$, the called subscriber picks up his hand-set, communication is established, and lasts until time $t_5$ as shown by line 99.

At time $t_5$, the radio-telephone hand-set is replaced to cut off transmission at frequency $f_o$ on channel 68, which in turn cuts off transmission of this frequency on channel 18, shown by the arrow $F_4$. The disappearance of the frequency $f_o$ produces a general return to zero, that is the apparatus returns to the ready condition.

A time $t_6$ the same transmitter-receiver F again has to provide the general call code. A frequency search along line 94 is started from the channel 18.

Although the present invention has been described with reference to but a single embodiment, it is to be understood that the scope of the invention is not limited to the specific details thereof, but is susceptible of numerous changes and modifications as would be apparent to one with normal skill in the pertinent technology.

What we claim is:

1. In a system for establishing communications between a telephone network having an exchange connected to a connection apparatus by ingoing and outgoing telephone lines and a group of radio-telephones, each having its own individual call-code and operating in duplex connection with common carrier frequencies, the connection apparatus comprising at least two transmitter-receivers each having a first variable coder capable of being set to a selected individual call-code to call the corresponding radio-telephone and a second fixed coder for transmitting a general call-code available to any radio-telephone wishing to establish communication with the telephone network;

selection means connected to the transmitter-receivers to enable only one transmitter-receiver at a time to transmit the general call-code; and cut-off means in each transmitter-receiver to cut-off transmission of the general call-code when the transmitter transmitting it enters into a communication, wherein each transmitter-receiver of the connection apparatus includes means for actuating said cut-off means to cut-off transmission of the general call code in response to receipt of an engaged tone from a radio-telephone establishing a communication with a telephone subscriber and generator means for transmitting the engaged tone simultaneously with the general call code.

2. Apparatus as claimed in claim 1, wherein each transmitter-receiver includes enabling means for enabling said generator means to the engaged tone in response to the reception of the engaged tone from a radio-telephone establishing a communication with a telephone subscriber.

3. Apparatus as claimed in claim 2, wherein said enabling means includes means to cut-off transmission of the engaged tone when the communication is broken.

4. Apparatus as claimed in claim 3, wherein N lines are available for carrying traffic between the radio-telephones and between a radio-telephone and the telephone network on duplex radio links, and including means to transmit the general call code on a free channel for a period of at the most N times the decoding period of an individual call and to locate a different free channel at the end of this period.

5. Apparatus as claimed in claim 1, wherein said selection means includes a stepping means selectively connecting an acquisition signal in sequence to said transmitter-receivers for initiating generation of said general call code therein and a drive unit for advancing said stepping means.

6. Apparatus as claimed in claim 5, wherein said selection means includes first means in each transmitter-receiver for connecting said acquisition signal from said stepping means to said drive unit to advance said stepping means to another transmitter-receiver in response to receipt of an engaged tone from a radio-telephone.

7. Apparatus as claimed in claim 6, wherein said first means includes an engaged tone detector providing an output in response to detection of said engaged tone and a first relay actuated in response to the output of said tone detector to connect the acquisition signal received from said stepping means to said drive unit.

8. Apparatus as claimed in claim 6, wherein said selection means includes second means in each transmitter-receiver for connecting said acquisition signal from said stepping means to said drive unit to advance said stepping means to another transmitter-receiver in response to receipt of a signal from said exchange.

9. Apparatus as claimed in claim 8, wherein said second means includes a second relay actuated in response to receipt of a signal from said exchange to connect the acquisition signal received from said stepping means to said drive unit.

10. Apparatus as claimed in claim 5, wherein said cut-off means includes control means responsive to receipt of said acquisition signal for effecting transmission of said general call code by said second fixed coder and inhibiting means for inhibiting said control means in response to receipt in said transmitter-receiver of an engaged tone.

11. Apparatus as claimed in claim 10, wherein said selection means includes first means in each transmitter-receiver for connecting said acquisition signal from said stepping means to said drive unit to advance said stepping means to another transmitter-receiver in response to receipt of an engaged tone from a radio-telephone.

12. Apparatus as claimed in claim 11, wherein said first means includes an engaged tone detector providing an output in response to detection of said engaged tone and a first relay actuated in response to the output of said tone detector to connect the acquisition signal received from said stepping means to said drive unit.

13. Apparatus as claimed in claim 12, wherein said inhibiting means includes a first AND gate whose output is connected in operation of said control means, said acquisition signal being connected to one input of said first AND gate and the output of said engaged tone detector being connected to a second input of said first AND gate through an inverter.

14. Apparatus as claimed in claim 13, wherein said control means includes a third relay actuated by the output of said first AND gate and having contacts for normally connecting said first variable coder to an output for transmission and connecting said second fixed coder to said output for transmission upon actuation of said third relay.

15. Apparatus as claimed in claim 14, wherein said third relay includes additional contacts for connecting said generator means to said output for transmission upon actuation thereof.

16. Apparatus as claimed in claim 15, wherein each transmitter-receiver includes enabling means for enabling said generator means to transmit the engaged tone in response to the reception of the engaged tone from a radio-telephone establishing a communication with a telephone subscriber.

17. Apparatus as claimed in claim 16, wherein said enabling means includes a second AND gate whose output is connected to said output for transmission, said generator means being connected to one input of said second AND gate and said output of said engaged tone detector being connected to a second input of said second AND gate.

18. In a receiver for a radio-telephone operating with a telephone network including a plurality of transmitter-receivers operating one at a time in duplex connection with common carrier frequencies to generate a general call code, an individual address code decoder and a general call code decoder, operating means for selectively energizing temporarily the general call code decoder when a connection must be established from the radio-telephone to said telephone network, means for scanning the duplex frequencies of said network, and means for stopping said scanning means in response to detection of the general call code by said general call code decoder, wherein said operating means includes a bistable flip-flop triggered by the discharge of a condenser selectively connectable thereto and arranged to be recharged in the non-connected condition.

19. A receiver as claimed in claim 18, wherein said operating means includes a bistable flip-flop triggered by the discharge of a condenser selectively connectable thereto and arranged to be recharged in the non-connected condition.

20. A receiver as claimed in claim 19, wherein said condenser is connected to a charging supply by a spring-loaded switch and is discharged by momentary operation of the switch.

* * * * *